3,256,122
METHOD FOR ADHERING AND SEALING FOIL TO GLASS FIBER

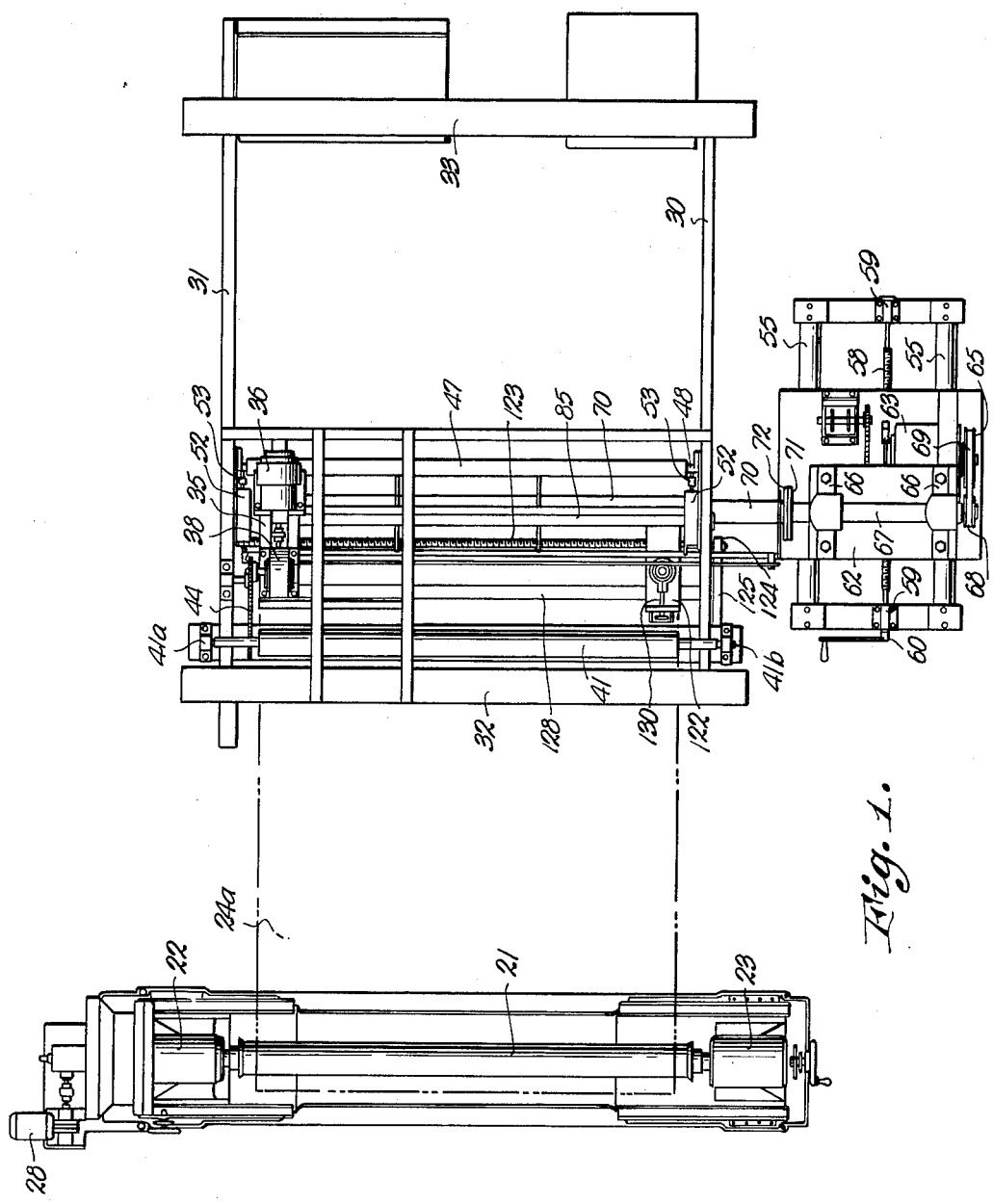

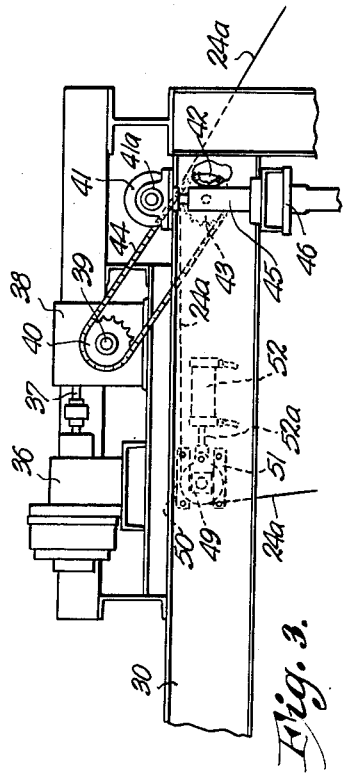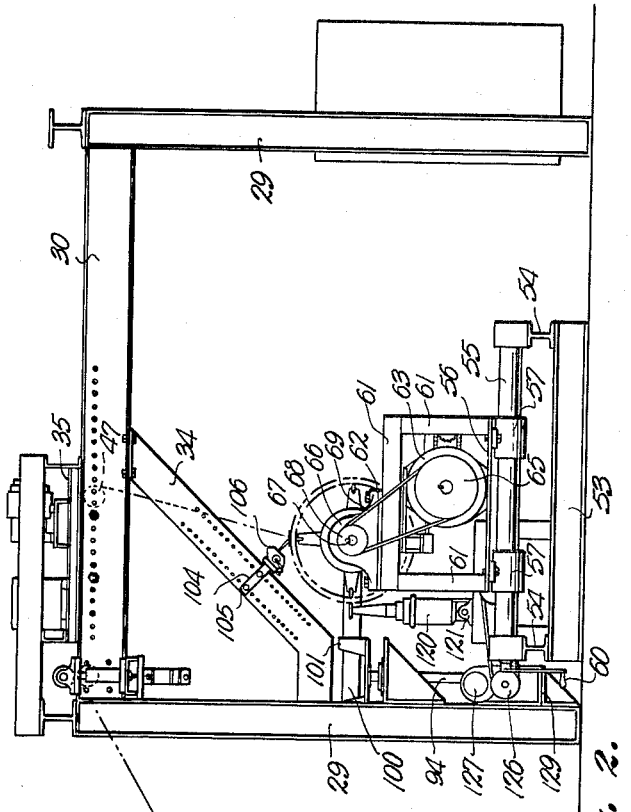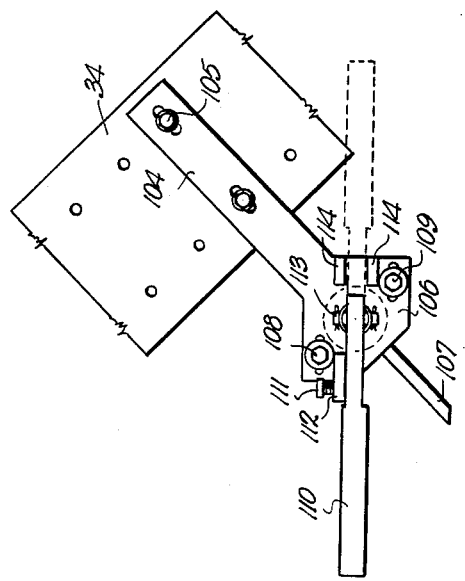

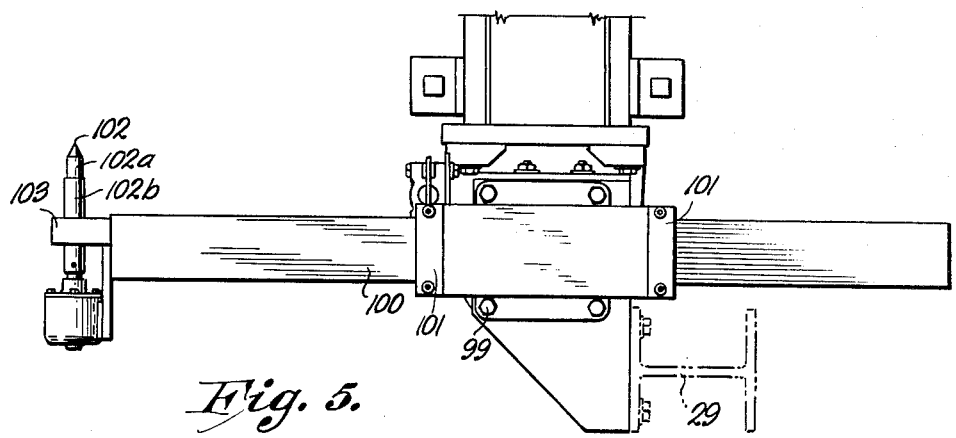
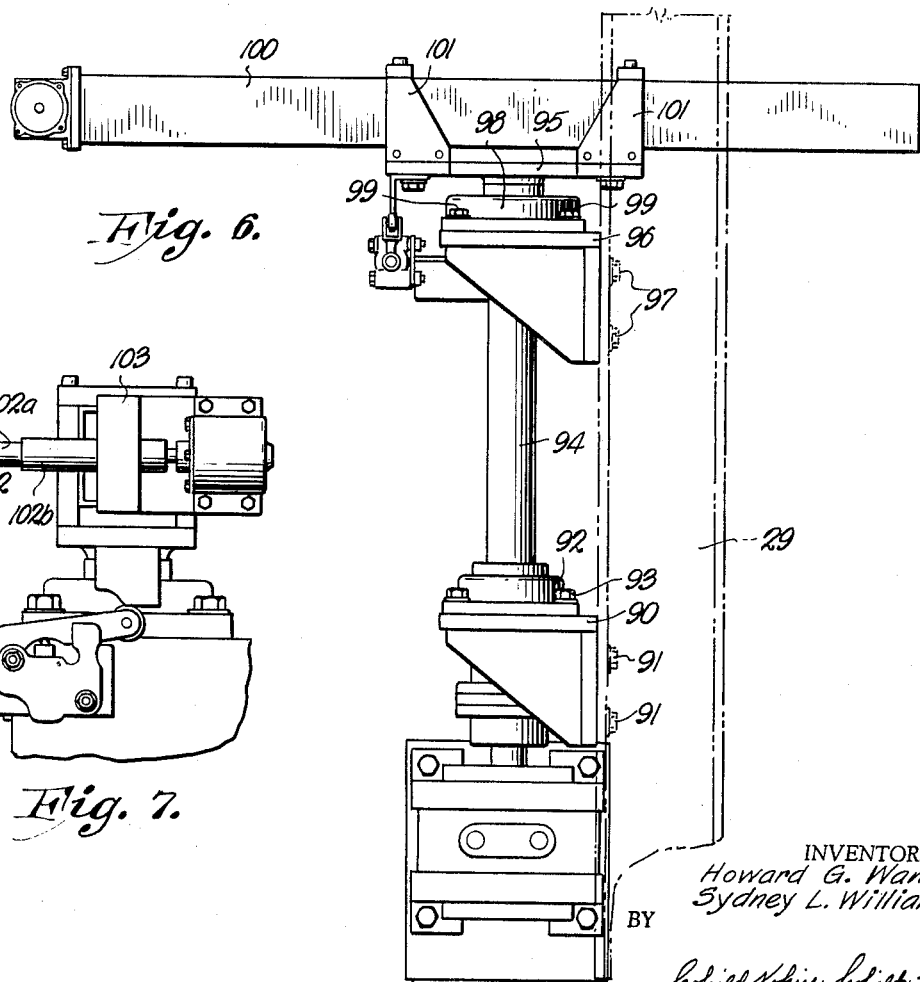

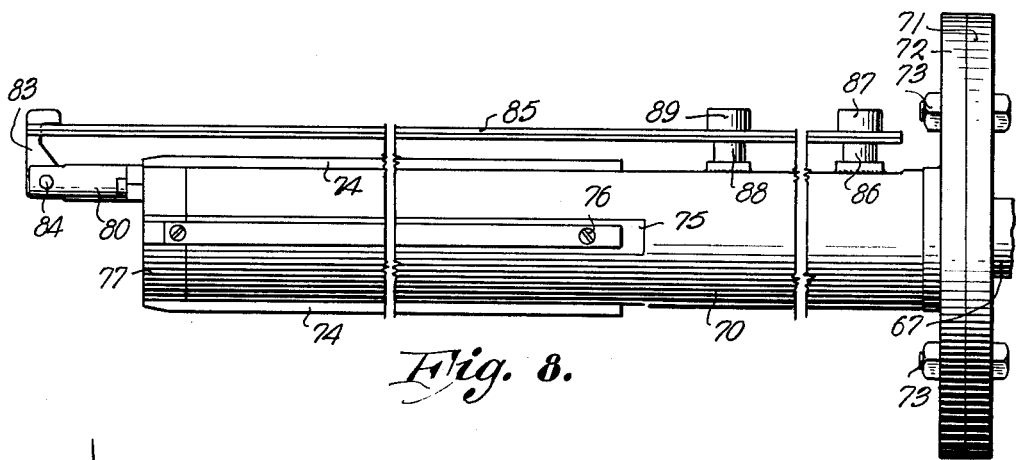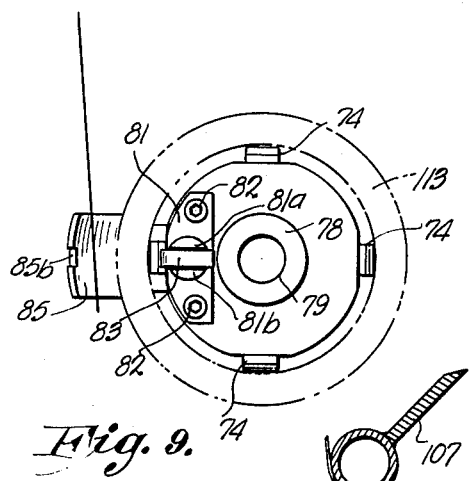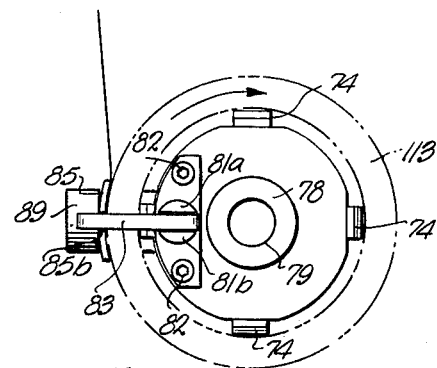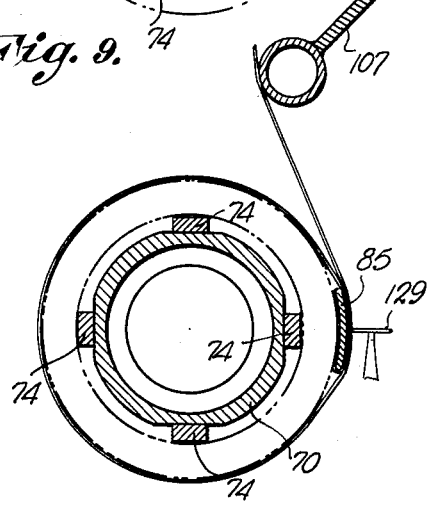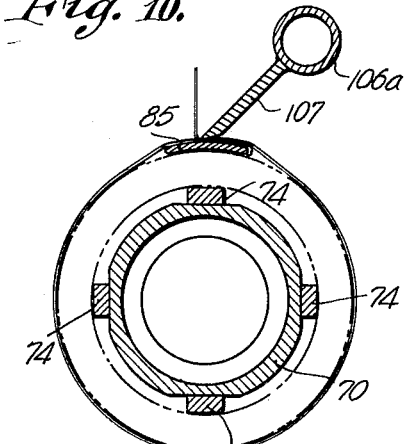

Howard G. Wands and Sydney L. Williams, Kansas City, Mo., assignors to Gustin-Bacon Manufacturing Company, Kansas City, Mo., a corporation of Delaware
Filed May 4, 1962, Ser. No. 192,455
4 Claims. (Cl. 156—73)

This invention relates to methods for adhering and sealing heavy aluminum foil on the exterior surfaces of glass fiber ducts whereby to serve as a vapor barrier and refers more particularly to such methods and apparatus wherein ultrasonic welding means are employed to seal the said foil on the said duct.

U.S. Patent 2,790,464, issued April 30, 1957, Stephens et al., "Insulated Duct" discloses a typical glass fiber insulated duct usable as a heat conduit for perimeter heating systems wherein heated or cooled air is distributed in hot-air heating systems or air-conditioning systems or both. This patent also discloses the provision of such ducts with an interior foil or film, an exterior foil or film, or both. The patent to Hogendobler, 2,952,298, issued September 13, 1960 "Methods and Apparatus for Affixing Flexible Tubing to Work Pieces Using Tubing From a Continuous Source" discloses methods of and apparatus for applying formed, cylindrical, flexible tubing to the exterior surface of cylindrical ducts by expansion of the tubing within the vacuum apparatus prior to insertion of the work piece of duct therein.

The instant methods and apparatus are directed to application of a nonformed sheet or length of metallic foil, that is, one not already in sleeve or cylindrical tube configuration, to the exterior surface of a work piece or duct section, followed by the formation of a seam at the edges of the covering material, whereby to provide an enclosing sleeve covering on the duct, as desired.

An object of the invention is to provide methods of and apparatus for adhering, applying and sealing metal foil covers on and to the exterior surfaces of glass fiber duct members.

Another object of the invention is to provide methods of and apparatus for snugly fitting metallic foil vapor barrier covers about a relatively soft, tubular, fibrous section of insulating duct and thereafter ultrasonically welding the same to provide a continuous sheet cover therefor.

Another object of the invention is to provide apparatus for applying metallic foil to the exterior surface of a fibrous insulating duct section in such manner as to tension the foil thereon prior to the formation of the seam therein.

Another object of the invention is to provide means for receiving a hollow length of fibrous insulating duct on a mandrel attaching a section of metallic foil vapor barrier thereto, rotating the mandrel to wrap the foil around the duct section, ultrasonically welding the foil on the duct outer surface, severing the welded foil section from the source of foil, and removing the sealed duct section from the mandrel.

Another object of the invention is to provide an anvil element adapted to overlie a portion of a glass fiber duct section in such manner as to both initially secure a metal foil cover thereto and also provide an ultrasonic welding surface to secure the foil on the exterior surface of the duct section.

Another object of the invention is to provide a mandrel-anvil combination for use in applying a metal foil vapor barrier cover to fibrous duct sections, which combination cooperates to secure and mount the foil on the duct section, as well as permit the welding thereof to form a continuous cover on the duct section, while permitting easy removal and application of the duct section and cover to and from the mandrel.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 1 is a plan elevation of the subject apparatus for applying metallic foil covers to fibrous duct sections with the foil source at the left and the duct receiving section centrally of the view.

FIG. 2 is a side elevation of the apparatus of FIG. 1 taken from the right-hand side of FIG. 1.

FIG. 3 is a fragmentary enlarged detail of the upper portion of the frame showing the pull rolls and tightener roll in detail taken from the opposite side of FIG. 2 from that shown.

FIG. 4 is a detail of the cutter bar and cutter bar operating mechanism taken from the opposite side from that shown in FIG. 2.

FIG. 5 is a plan view of the mandrel end support.

FIG. 6 is a side elevation of the mandrel end support assembly taken in a direction opposite the view of FIG. 2.

FIG. 7 is an end view of the mandrel end support taken from the left in FIG. 6.

FIG. 8 is a vertical plan view taken from above of the mandrel.

FIGS. 9–12, inclusive, show various stages in the wrapping of the foil around the duct, the welding of same and the separation of same from the source of foil.

FIG. 9 is a view taken from the left side of FIG. 8 showing the end of the mandrel with the duct mounted thereon, the anvil detached to receive the foil between the duct and the anvil.

FIG. 10 is a view subsequent to that of FIG. 9 and shows the anvil closed on the foil against the outside surface of the duct.

FIG. 11 shows the method in a later stage than in FIG. 10 with the foil wrapped completely around the mandrel and with an ultrasonic welding head in place making the foil seam over the mandrel anvil. FIG. 11 is 450° displaced in a clockwise direction from FIG. 10.

FIG. 12 is a view subsequent to FIG. 11, 90° in a counterclockwise direction therefrom, showing the tear bar in position for severance of the finished product from the source of foil.

Ultrasonic welding means have been provided of various constructions and operating characteristics. Patent 2,946,119, Jones et al., issued July 26, 1960, entitled "Method and Apparatus Employing Vibratory Energy for Bonding Metals" and the patent to Jones et al., 2,946,120, issued July 26, 1960, entitled "Seam Vibratory Welding Apparatus and Method" disclose typical vibratory and ultrasonic welding apparatus of the type typically utilizable in the instant process. Designation of these patents is not intended to be limiting, but merely to disclose and indicate one typical and operable apparatus. The 2,946,120 Patent is the most pertinent to the instant process in that it shows ultrasonic seam welding, which is the process employed here. The 2,946,119 Patent particularly shows ultrasonic spot welding. Yet further, the paper "Ultrasonic Welding of Electronic Components" by Potthoff et al., published by Aero Projects, Incorporated, West Chester, Pennsylvania, presented at the 1960 IRE National Convention, March 21–24, 1960, in New York City, discloses further details of both spot and seam welding techniques utilizing ultrasonic apparatus and methods. It should be understood that the ultrasonic welding process is not, per se, the instant invention and it is contemplated that any conventional ultrasonic seam welding techniques, as well as apparatus, or the equivalent thereof, may be employed with the instant apparatus and process.

Referring particularly to FIGS. 1 and 2, at 20 is generally designated an unwinding stand, which includes an elongate roller or shaft 21 received at the ends thereof in bearings 22 and 23 and adapted to carry thereon a roll of aluminum foil or other metallic sheet. Suitable vertical supports 25 mount bearings 22 and 23 which position shaft 21 in horizontal relationship parallel to floor 26. Any suitable base construction 27 carries the vertical supports 25. A power source such as an electric motor 28 is employed to translate shaft 21 laterally to line it up with the mandrel to be described. A drag brake may be employed on axle or shaft 21.

A support framework seen at the right in both FIGS. 1 and 2 is made up of vertical beams 29 supporting elongate side horizontal beams 30 and 31 and transverse horizontal beams 32 and 33. Tear bar supporting beams 34 are connected to the under sides of horizontal side beams 30 and 31 at their upper ends and at their lower ends to vertical beams 29.

A platform 35 is mounted above beams 30 and 31 by suitable members and carries a power source such as a suitable electric motor 36. The latter is connected by drive shaft 37 into gear box 38, from which drive shaft 39 drives sprocket 40. A pair of elongate pull rolls or rollers 41 and 42 are mounted on horizontal side beams 30 and 31 by suitable bearings such as those seen at 41a and 41b in FIG. 1 for roller 41. Roller 42 is journaled immediately below roller 41. A sprocket 43 connected to the shaft mounting roller 42 is engaged by chain 44 communicating same with sprocket 40. In operation of the foil feed system, with sheet 24a of foil from roll 24 of the foil engaged between pull rolls 41 and 42, the drive from motor 36 through chain 44 pulls the sheet from the roll. Upper roller 41 preferably has mounting bearings 41a and 41b thereof carried by the pistons of hydraulic cylinders 45 which are mounted on suitable support means 46. Upper roller 41 may thus be moved upwardly to permit feed of a new sheet of foil from a fresh roll 24 thereof between the rollers 41 and 42. By this means also, regulation of pressure on the sheet and control of tracking of same may be accomplished.

A push or tightener bar 47 is fixedly mounted on shaft 48 which is received at its ends in slide blocks 49. Slide blocks 49 are slidably received between upper and lower brackets 50 and 51 which are mounted on the inside opposed faces of beams 30 and 31. An hydraulic cylinder 52 is fixed to the inside opposed faces of each of beams 30 and 31 and has an extendible and retractable piston shaft 57a connected to slide members 49, whereby to slide same back and forth and move push roll 47 toward and away from fixedly mounted hydraulic cylinders 52.

Referring to FIG. 2, I-beams 53 on floor 26 mount transverse, like I-beams 54 which receive thereon and fix thereto elongate cylindrical shafts 55. A first lower platform 56 is mounted on sleeves 57 slidably received on shafts 55, whereby to move to and fro thereon. Referring particularly to FIG. 1, an elongate externally threaded shaft 58 is journaled at the ends thereof in bearings 59 with crank 60 fixed to one end thereof whereby to rotate same. Threaded shaft 58 is received in an internally threaded nut member (not shown) fixed to the under side of platform 56 to and fro by rotation of handle 60. Frame members 61 mounted on platform 56 mount a secondary upper platform 62 in horizontal relationship above platform 56.

A conventional power source 63 such as a torque actuator drives shaft 64 with sheave 65 thereon. To maintain constant tension on the foil which is drawn by the pull rolls, actuator 63 is preferably provided having a 270° arc, working through a 2:1 ratio whereby a 540° shaft arc is available. Bearings 66 on platform 62 rotatably mount elongate shaft 67 which has pulley 68 thereon. The latter is engaged by belt 69 also engaging sheave 65. Mandrel 70 (FIG. 8) is connected to disc 71 which is joined by bolts 73 to disc 72 on shaft 67 whereby to be driven by power source 63.

Referring particularly to FIG. 8, mandrel 70 has a plurality of relieved portions 75 to which are attached elongate radial strips 74 by screws 76, internally threaded holes being provided in recesses 75. FIGS. 9 and 10 show the free end of the mandrel shaft with cap 77 secured thereto having a socket 78 centrally thereof providing an opening 79 for purposes to be described. Elongate member 80 is fixed to cap 77 by plate 81 and screws 82 and has paired end legs 81a and b. An anvil-engaging key 83 is pivotally mounted on shaft 84 communicating between legs 81a and 81b whereby to be pivotable 90° as seen in FIGS. 8, 9 and 10. Anvil 85, comprising an elongate piece of steel plate curved to fit the outside circumference of a glass fiber duct fitted over mandrel 70, is mounted substantially parallel to mandrel shaft 70. As seen in FIG. 8, the right-hand end of the anvil is fixedly received on shaft 86 secured by head 87. This is a rigid connection. A second like connection of the right hand end of the anvil is seen in FIG. 8 at 88 and 89.

FIGS. 5–7, inclusive, show the means provided for engaging and disengaging the free end of the mandrel (to the left in the view of FIG. 8). Referring to these figures, vertical I-beam 29 has bearing platform 90 fixed thereto by bolts 91 mounting bearing 92 thereon by bolts 93. Elongate shaft 94 extends upwardly from bearing 92 and supports table 95 thereon. An additional bearing carrying platform 96 is mounted on beam 29 by bolts 97, the former carrying bearings 98 thereon fixed thereto by bolts 99. Elongate arm 100 is slidably grasped by clamps 101 on table 95 and has male probe member 102 at one end thereof, having a first portion 102a adapted to be inserted in the socket opening 79 in the end of mandrel 70 with larger portion 102b acting as a stop limiting engagement with the mandrel. Frame member 103 connects probe 102 to the end of arm 100.

It will thus be observed that horizontal motion or translation of mandrel shaft 70 by means of screw 58 actuated by handle 60 may be matched by adjustment of position of arm 100 through clasps 101 whereby probe 102 will always be able to engage socket 79.

Straps 104 are bolted by bolts 105 to angled beams 34. At the lower ends of straps 104 are positioned mounting plates 106. Plates 106 pivotally mount a shaft 106a on which is carried an elongate tear or cutter bar 107. A pair of adjustable bolts 108 and 109 are provided on plates 105 to permit adjustment of the flange bearing carried thereby mounting the tear bar carring shaft. The view of FIG. 4 is taken opposite in direction to the view of FIG. 2. Stop 112 with screw adjustment 111 is mounted on plate 105. Handle 110 is pivotally mounted by a pin 113 on the end of shaft 106 which carries tear blade 107. Lock stops 114 are positioned on the other side of plate 106 from stop 112. Handle 110 may be moved in an arc around its pivot toward the viewer in FIG. 4 (starting in the full line position), then pivoted in a clockwise direction to the dotted line position of FIG. 4 and then pushed away from the viewer in an arc to lock it in position between stops 114. This 180° pivot moves blade 107 from the full line position of FIG. 4 to a position 180° therefrom in a clockwise direction. FIG. 2 shows the opposite plate 106 from that in FIG. 4 receiving the other end, the nonhandled end, of shaft 106 carrying blade 107 for pivotal movement. Blade 107 in FIG. 2 is shown in operating (foil tearing) position.

In operation, foil from a roll of metallic sheet, such as aluminum, mounted on shaft 21, is drawn up and passed between pull rolls 41 and 42, the former initially being moved upwardly to permit convenient passage of the foil therethrough. The sheet is then drawn over push bar 47 and down to a level opposite the mandrel shaft 70. At this point, a hollow cylindrical duct of fibrous material such as glass fiber may be slid onto mandrel shaft 70 over bars 74, after catch 83 is disengaged from anvil 85 and member 88 is turned so as to permit the anvil to move away from the outer surface of the mandrel. The duct may be moved along the mandrel shaft until it reaches a predetermined mark which may be applied thereto corresponding to one edge of the current foil feed limits. This results in an arrangement in the manner shown in FIG. 9.

With the sheet inserted between the expanded anvil and the outer surface of the duct, the former is then moved into the position of FIGS. 8 and 10, pinning the end edge of the foil sheet between itself and the outer surface of the duct. During the time the duct 113 is being applied to the mandrel shaft 70, arm 100 is in a position 90° from the position of FIGS. 5-7 whereby not to impede the placing of the duct on the mandrel shaft. This position is substantially parallel to the anvil shaft. Arm 100 may be moved into positive engagement with the mandrel shaft's free end after application of the duct and either before or after the application of the anvil to the outside surface of the duct.

With foil sheet 24a engaged as in FIG. 10 and arm 100 in such position that male member 102 engages socket 79 in the free end of mandrel shaft 70, the latter, by means of power source or torque actuator 63 is rotated 540° in a clockwise direction in the view of FIG. 10 to the position of FIG. 11. The foil feed commences automatically after 90° clockwise mandrel turn. In this position, as may be seen, the foil is wrapped completely around the duct, thereby furnishing a double thickness over the anvil 85. A seam may now be produced in the overlapped foil by use of a conventional ultrasonic welding device, the welding head assembly of which is generally designated at 120.

Said welding head assembly is pivotally mounted on brackets 121 fixed to a platform 122. On the under side of platform 122 is positioned an internally threaded member which engages an elongate externally threaded cylindrical rod 123. The latter is pivotally mounted or rotatably mounted in suitable brackets by the externally nonthreaded ends thereof (not shown). A pulley 124 is mounted on one end of shaft 123 and is engaged by belt 125 which is driven through a pulley 126 on the drive shaft of a power source such as an electric motor 127. The latter is mounted on a suitable platform 128 adjacent the left-hand vertical columns 29 in FIG. 2. Suitable supports 128 are provided, additionally, under platform 122 whereby the said platform may be translated to and fro (up and down in FIG. 1) by rotation of externally threaded rod 123. The ultrasonic welding contact wheel 129, which conventionally has a diameter of several inches, is brought into pressure contact with the foil overlap on the anvil by any suitable conventional hydraulic means schematically indicated at 130 in FIG. 1 mounted on platform 122. The anvil itself serves as a substantial firm base supporting the foil in the welding operation. The welding device is transverse along the mandrel by the mechanism immediately described. After the weld has been completed, the welding wheel 129 is drawn back from the foil by the said hydraulic means 130. A weld may be made in motion in each direction.

From the welding position of FIG. 11 and following the welding operation, mandrel shaft 70 is rotated 90° in a counterclockwise direction to that position shown in FIG. 12. By means of handle 110, tear bar 107 is then moved from the position corresponding to that of the dotted handle position of FIG. 4 to the full line position of 107 whereby to permit the operator's manual ripping off of free foil from the top of the anvil. The operator then returns the mandrel shaft 450° counterclockwise (to recock the torque actuator) from the position of FIG. 12 to that of FIG. 9 and unlatches the anvil by means of engagement member 83. After pivotal disengagement of arm 100, the foil wrapped welded duct may then be removed from the mandrel and another substituted therefor to begin the cycle again.

A number of adjustments permit the handling of varying sized ducts in this apparatus. Thus, mandrel shaft 70 may be replaced by undoing bolts 73 and substituting a mandrel of greater or lesser diameter. Secondly, as previously noted, the mandrel shaft drive may be translated to the right or left in FIG. 1 to move the same and the mandrel shaft attached thereto toward or away from the welding unit assembly to provide for greater or lesser diameter mandrels. Likewise, bar 100 may be adjusted relative to clasps 101 to extend or shorten arm 100 relative to shaft 94. Still further, the tear bar assembly may be moved up or down on slanted beams 34 to accommodate to varying sized ducts and mandrels.

The function of push bar 47 is to tighten the sheet after it has been wrapped around the duct immeidately prior to welding (FIG. 11). Thus, after the torque actuator 63 has been actuated to move the mandrel from the position of FIG. 10 to FIG. 11, the hydraulic cylinders 52 may be actuated whereby to stretch the sheet and tension it on the duct. The tight grasp or compaction of the anvil on the compressible duct cross section and the foil overwrap pins the foil tightly whereby the sheet does not pull free. The pull rolls 41 and 42 are preferably rubber coated.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method for applying metal foil sheet to the external surface of fibrous insulating ducts comprising applying a fibrous insulating duct to a rotatable mandrel, feeding one end edge of an elongated metal foil sheet to the vicinity of said mandrel, pinning said end edge of said elongate foil sheet to the external surface of the duct by means of an elongate anvil strap mounted relative to said mandrel, rotating said mandrel on its axis against the direction of feed of said sheet until a double thickness of foil overlies said anvil strap, and forming a seam in said sheet at said overlap on said anvil.

2. A method as in claim 1 wherein the rotation of the mandrel is approximately 540° from the position of the mandrel where the sheet is engaged thereagainst by the anvil to the seam formation position.

3. A method as in claim 2 wherein the mandrel is rotated at least 90° in the opposite direction from the seam formation position to a severance position and the severance is made against the said anvil strap.

4. A method for applying metal foil sheet to the external surface of fibrous insulating ducts comprising applying a fibrous insulating duct to a rotatable mandrel, feeding one end edge of an elongate metal foil sheet to the vicinity of said mandrel, pinning said end edge of said elongate foil sheet to the external surface of the duct by means of an elongate anvil strap mounted relative to said mandrel, rotating said mandrel on its axis against the direction of feed of said sheet until a double thickness of foil overlies said anvil strip and forming a seam in said sheet at said overlap on said anvil, the seam formed by an ultrasonic welding process over the outer surface of said anvil.

(References on following page)

References Cited by the Examiner

UNITED STATES PATENTS

| | | | |
|---|---|---|---|
| 1,438,689 | 12/1922 | Berry | 242—74.1 |
| 1,484,311 | 2/1924 | Tischer | 156—190 |
| 2,454,074 | 11/1948 | Marc | 156—190 |
| 2,859,920 | 11/1958 | Flahan | 242—74.1 |
| 2,985,954 | 5/1961 | Jones | 156—73 |
| 3,055,278 | 9/1962 | Kinneman | 156—191 |
| 3,082,141 | 3/1963 | Steele et al. | 156—189 |

EARL M. BERGERT, *Primary Examiner.*

DOUGLAS J. DRUMMOND, *Examiner.*